United States Patent

Goodrich

[15] 3,699,270

[45] Oct. 17, 1972

[54] TELEPHONE DISCONNECT DEVICE

[72] Inventor: Robert S. Goodrich, 27901 South Golden Meadow Drive, Palos Verdes Peninsula, Calif. 90274

[22] Filed: Aug. 17, 1970

[21] Appl. No.: 64,308

[52] U.S. Cl. ....................................179/158, 179/167

[51] Int. Cl. ...............................................H04m 1/19

[58] Field of Search ...............................179/158, 167

[56] References Cited

UNITED STATES PATENTS

| | | | |
|---|---|---|---|
| 2,838,615 | 6/1958 | Leifer | 179/158 |
| 2,403,498 | 7/1946 | Brittingham | 179/158 |
| 3,588,387 | 6/1971 | Smith | 179/167 |

*Primary Examiner*—William C. Cooper

*Attorney*—Sokolski & Wohlgemuth

[57] ABSTRACT

A telephone cut off device for a telephone transmitter which is an insert disposed between the mouth piece of the transmitter and the main transmitter housing. The device has contacts on one side thereof for engaging the spring contacts in the transmitter housing, the contacts extending through the device to engage the corresponding terminals on the transmitter capsule unit. A depressible means for moving one of the contacts in the device is provided to break the contact between a corresponding spring contact in the transmitter between a corresponding spring contact in the transmitter housing and corresponding terminal in the capsule unit.

13 Claims, 5 Drawing Figures

INVENTOR
ROBERT S. GOODRICH
BY
SOKOLSKI & WOHLGEMUTH
ATTORNEYS

TELEPHONE DISCONNECT DEVICE

It is often desirable to be able to cut off the transmitter unit of a telephone so that conversations can be held without the information being passed on to a conversant on the opposite end of the telephone line. The need for such units has been recognized in the past. For example, such a device as disclosed in U.S. Pat. No. 2,838,615 wherein a separate cut out unit is inserted between the internally threaded mouthpiece containing the transmitter capsule unit and the transmitter housing. In this patent, the cut out device so inserted has terminals adapted to engage with the spring contacts in the transmitter housing and the terminals on the transmitter capsule located on the opposite side of the device from the spring contacts. Spring mounted depressible arcuate strips were provided on the outside of the device which served when depressed to bridge the contact means in the cut off device serving to short circuit them and render the transmitter unit ineffective. In other words, the device in this patent utilized a depressible switch to provide a short circuiting by providing a metal contact or bridge between the two terminals in the transmitter. The device required a plurality of pins which were spring mounted to achieve the desired short circuiting and thus was of a relatively complex and costly construction. Any deformation or misalignment of the spring mounted pins would prevent the desired short circuiting and thus it was required to have a plurality of them to assure that at least one of the pins would achieve the desired short circuiting. Other cut off devices have required rotation of a portion of the mouthpiece or have been of complex and expensive construction. Further, some of the prior devices have severely interfered with could deleteriously effect the operation of the telephone unit.

Thus an object of this invention is to provide a telephone cut off device which is of simple construction.

Another object of this invention is to provide a telephone cut off device which cannot deleteriously effect the operation of the telephone.

Another object of this invention is to provide a telephone cut off device which has assured operation for achieving its desired purpose.

The above and other objects of this invention are accomplished by a cut off device which is in effect an insert to be disposed between the mouthpiece and the main transmitter housing of the telephone. The insert is provided with a means such that it can be adjustably disposed on the transmitter housing while on the opposite side having threads for readily engaging the mouthpiece of the unit. The device is comprised of two mounted contacts. A center contact extends therethrough which maintains an electrical connection between a center spring contact member of the phone and the corresponding contact in the transmitter capsule unit which is disposed on the opposite side of the cut off device. Additionally, the cut off device has a second contact extending therethrough which serves to maintain an electrical connection between an outer spring contact in the transmitter housing and a circumferential ring contact on the capsule. A depressible button or the like is mounted externally of the cut off body, such that when it is depressed inwardly toward the body, it serves to move the outer contact of the cut off device, breaking electrical connection between the outer spring contact in the transmitter housing and the ring contact on the transmitter capsule. The telephone user will hear a click when this contact is broken indicating that the cut off device is actuated.

It is believed that the invention will be better understood from the following detailed description and drawings.

Figures 1, 2, 3, 4, 5:
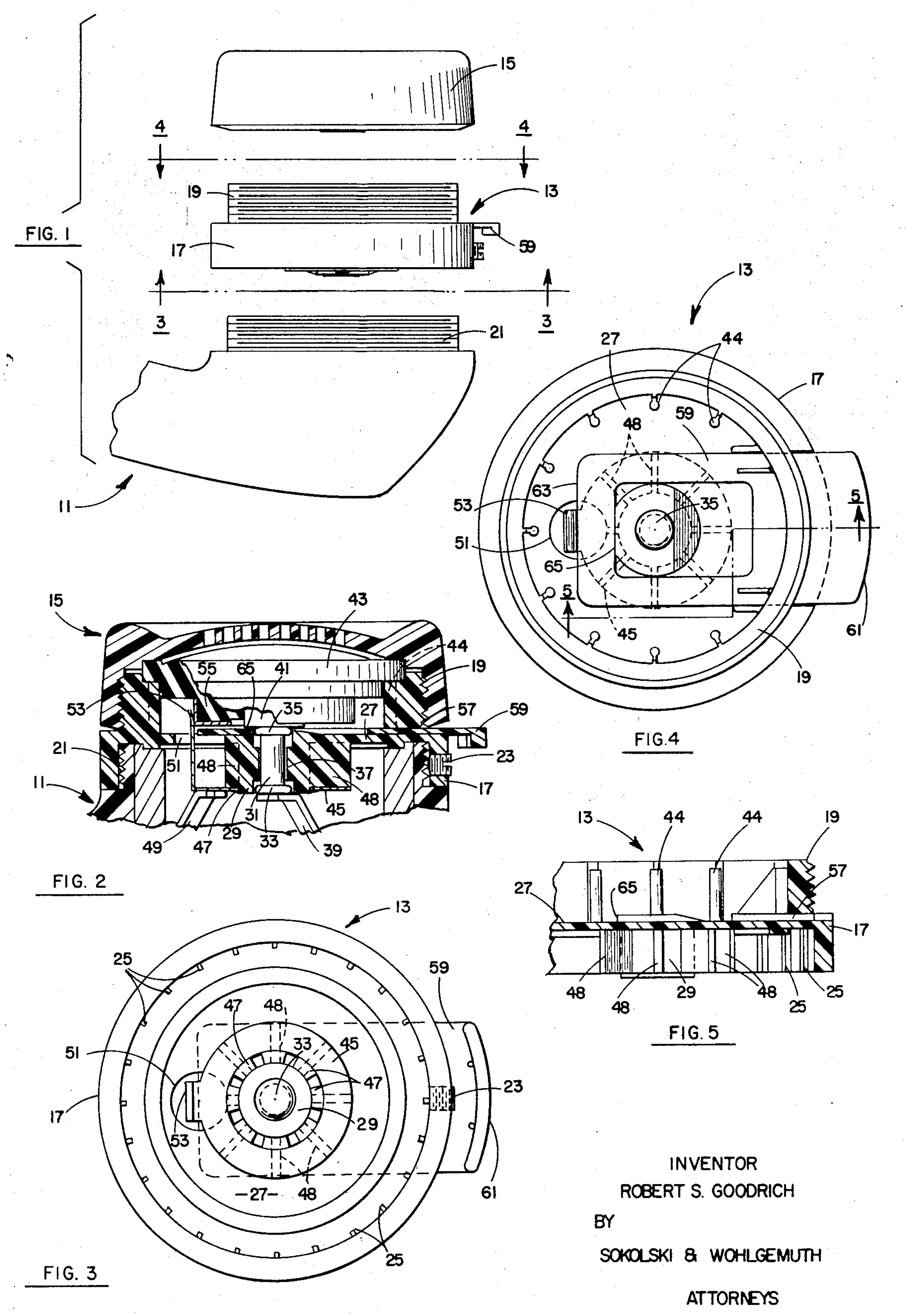
FIG. 1 is an exploded view of a portion of the hand set including the cut off device of the invention.
FIG. 2 is a cross-sectional plan view of a telephone hand set having the device of the herein invention inserted therein.
FIG. 3 is a cross-sectional view of the cut off device of the invention taken along lines 3—3 of FIG. 1.
FIG. 4 is a cross-sectional view of the cut off device of the invention taken along lines 4—4 of FIG. 1.
FIG. 5 is a partially sectioned fragmentary view of the device of the invention.

Turning now to the figures, there is seen in FIG. 1 the transmitting portion of a telephone handset 11 having the cut off device 13 of the invention disposed between the handset 11 and the normal mouthpiece element 15. The device 13 of the invention has an outer cylindrical wall portion 17 which corresponds in diameter to the mouthpiece 15. Integrally formed with an extension from one side of the wall portion 17 is an externally threaded cylindrical ring 19 which threadably engages the mouthpiece element 15 as seen in FIG. 2. In the preferred embodiment of this invention the wall portion 17 is not in threaded engagement with the threads 21 on the handset 11 since it is desirable to position the unit according to the particular user, as will be further explained. Thus, the device 13 can be affixed to the transmitter unit by at least one set screw 23 which passes through the wall 17 to engage the threads 21. Though one set screw is shown 23 it can be understood that a plurality can be used. To further assure the contact, a plurality of ridges 25 as seen in FIG. 3 can extend inwardly from the wall 17 to engage the threads 21. The ridges serve to maintain pressure contact between the device and the threads 21 and prevent rotation.

The cut off device 13 has an intermediate flat surface 27 which extends across the top of the cylindrical wall portion 17 separating it from the externally threaded ring 19 dividing the device into top and bottom portions. Extending downwardly toward the transmitter unit concentrically within the wall 17 is a collar 29 having a movable pin 31 of a conductive material having enlarged head ends 33 and 35 respectively. Collar 29 has a reduced diameter portion 37 formed intermediate of the ends 33 and 35 of the movable pin so as to restrain the pin in the collar. The pin 31 can be of a straight cylinder which is inserted through the reduced diameter portion 37 with the enlarged ends 33 and 35 being pressed or tight fitted thereon.

The capsule unit 43 is seated on pillars 44 disposed about the inner periphery of the ring portion 19. When the cut off device 13 is installed, as shown in FIG. 2, the bottom portion 33 of the pin 31 is in contact with a center spring contact 39 in the transmitter housing. The end 35 forms an electrical connection with the center contact 41 of the transmitter capsule unit 43. Press fitted and concentrically surrounding collar 29 is a ring 45 of a conductive metal material which is attached by inwardly extending tabs 47 that grip the outer circumference of the collar 29. Additionally, as further seen in FIG. 5, supporting the ring 45 and preventing it from moving upwardly on the collar are a plurality of radial ridges 48 surrounding and integrally formed with the collar 29.

The ring 45 is in contact with outer spring contact 49 of the transmitter. By utilizing the ring 45, it can be thus appreciated that no matter in what location the device is seated on the transmitter, both the spring contacts 39 and 45 will be touching the respective counterparts of the cut off device of the invention. Integrally formed with the ring 45 and extending upwardly therefrom through an opening 51 in the top surface 27 is a moveable spring contact portion 53 which touches the outer contact ring 55 of the capsule unit, as shown in FIG. 3. Thus it is preferred that the conductor 53 be of a spring metal construction and that be biased radially inwardly so that it will maintain the connection desired with the ring contact 55. As a result, when the cut off device of this invention is in place, the inner spring contact 39 is maintained in electrical connection with the center contact 41 of the capsule unit while the outer spring contact 49 is maintained in electrical connection with the outer ring contact 55 in the capsule unit through the spring element 53.

A slot 57 is provided through the outer wall 17 of the cut off device adjacent the threaded collar portion 19. Extending through the slot is a flat slidable cut off button 59. One outer end 61 of the button 59 is disposed outside of the device where it can be depressed by the user, while the opposite inner end 63 is disposed adjacent to the spring contact 53. When the button is depressed inwardly, spring 53 is moved away from the ring contact 55 thus breaking the electrical connection between the outer spring 49 and the ring contact 55 serving to cut off the transmitter. Upon releasing the button 59 the spring contact 53 will return to maintain its contact with the outer ring 55 forcing the button outwardly from the device.

A slight ridge 65 as seen in FIG. 5 is provided on the top surface 27 which serves to stop the rearward motion of the button when forced outwardly by the movement of the spring contact 53 and prevents the button from being disengaged from the device.

It should be pointed out that the entire cut off device can be molded of a single piece of plastic with the only three additional parts including the center metal contact button 31, the metal ring contact 45, and the movable button 59 which additionally can be formed of plastic. As a result, the device is lightweight, made to resemble and integrated with the telephone in which it is used. A spring contact 53 should be sufficiently strong to force the button outwardly. However, it also should be easily displaced by the button when for example the phone is placed on a table resting on the button 59 such that the weight of the phone can easily depress the button inwardly serving to move the spring and disconnect the transmitter. It should now be appreciated that it is particularly desirable to position the button 61 at any location according to the desires of the user on the transmitter. For example, a right handed person would want the button in a different position than a left handed one. Additionally, an individual might want to depress the button with the forefinger as compared to the thumb. Because of these variables it is particularly desirable that the device be rotatable to any position on the phone. It is for this reason that the set screws are utilized and a threaded engagement between the device and the transmitting unit 11 is not preferred.

I claim:

1. A device for cutting off voice transmission in a telephone transmitter contained in a handset housing having two spring contacts and a separate capsule unit having corresponding contacts for engagement with the spring contacts comprising:
   - a housing of an insulative material disposed between and engaging said telephone transmitter spring contacts and the capsule unit,
   - a first means in said housing for providing an electrical connection between one said spring contact and the corresponding contact on the capsule unit,
   - a second movable means in said housing for providing an electrical connection between the other spring contact and a corresponding contact on the capsule unit,
   - and switch actuator means in said housing extending externally thereof, a portion of said switch actuator means disposed adjacent said movable means in said housing for providing electrical connection whereby upon actuation of said switch an electrical connection can be broken by movement of said movable means.

2. The device of claim 1 wherein:
   - said moveable means for providing electrical connection has a resilient conductor arm adjacent said switch actuator, said arm being deformable upon actuation of said switch actuator means.

3. The device of claim 2 wherein:
   - said switch actuator comprises a generally flat slidable member which moves said conductor arm to break electrical connection when depressed inwardly toward said housing.

4. The device of claim 2 wherein said arm is affixed to a conductor ring mounted in said housing, said ring adapted for engagement with a spring contact in said transmitter.

5. The device of claim 1 wherein said housing has a generally cylindrical outer wall and a transverse surface within the wall.

6. The device of claim 5 wherein:
   - said first means is an electrical connector extending through the center of said surface from one side to the other thereof.

7. The device of claim 6 wherein said second moveable means comprises:
   - a resilient conductor arm passing through an opening provided in said surface, said arm extending from one side of the surface to the other.

8. The device of claim 7 further comprising:
   - a ring of conductive material circumferentially surrounding and insulated from said first connector, said ring spatially supported from one side of said surface, said conductor arm being affixed to said ring extending from said ring through said opening in said surface.

9. The device of claim 8 wherein said arm is of a spring metal.

10. The device of claim 8 wherein:

said switch actuator is a generally flat slidable member moveable on one side of said surface to engage and move said conductor arm.

11. The device of claim 10 wherein:

said switch actuator is disposed adjacent the side of said surface of the housing opposite the side to which said ring conductor is affixed.

12. The device of claim 8 wherein:

said ring is mounted on a collar extending from one side of said surface circumferentially surrounding said first means for providing electrical connection.

13. A device for cutting off voice transmission in a telephone transmitter contained in a handset housing having two spring contacts and a separate capsule unit having corresponding contacts for engagement with the spring contacts comprising:

a housing of an insulative material disposed between and engaging said telephone transmitter spring contacts and the capsule unit, a first means in said housing for providing an electrical connection between one said spring contact and the corresponding contact on the capsule unit, a second movable means in said housing for providing an electrical connection between the other spring contact and a corresponding contact on the capsule unit, means extending externally of said housing for actuating said movable means to break the electrical connection provided thereby.

* * * * *